(12) United States Patent
Li et al.

(10) Patent No.: US 12,529,813 B2
(45) Date of Patent: Jan. 20, 2026

(54) SYSTEMS AND METHODS FOR NOISE ATTENUATION OF LAND CONTINUOUS RECORDS

(71) Applicant: SHEARWATER GEOSERVICES SOFTWARE INC., Houston, TX (US)

(72) Inventors: Chengbo Li, Houston, TX (US); Charles C. Mosher, Houston, TX (US); Yu Zhang, Houston, TX (US); Yongchang Ji, Houston, TX (US)

(73) Assignee: SHEARWATER GEOSERVICES SOFTWARE INC., Houston, TX (US)

( * ) Notice: Subject to any disclaimer, the term of this patent is extended or adjusted under 35 U.S.C. 154(b) by 613 days.

(21) Appl. No.: 17/867,297

(22) Filed: Jul. 18, 2022

(65) Prior Publication Data

US 2023/0028066 A1    Jan. 26, 2023

Related U.S. Application Data

(60) Provisional application No. 63/222,744, filed on Jul. 16, 2021.

(51) Int. Cl.
*G01V 1/36* (2006.01)

(52) U.S. Cl.
CPC ............ *G01V 1/36* (2013.01); *G01V 2210/32* (2013.01)

(58) Field of Classification Search
CPC .............................. G01V 1/37; G01V 2210/32
See application file for complete search history.

(56) References Cited

U.S. PATENT DOCUMENTS

| 7,515,505 B2 | 4/2009 | Krohn et al. |
| 8,509,027 B2 | 8/2013 | Strobbia et al. |

(Continued)

FOREIGN PATENT DOCUMENTS

| CN | 103954993 A | 7/2014 |
| WO | WO-2005019865 A2 | 3/2005 |

OTHER PUBLICATIONS

"Li Chengbo et al: A low-rank approximation method for ice-break noise attenuation of simultaneous vibroseis data, SEG Technical Program Expanded Abstracts, pp. 4930-4934" (Year: 2017).*

(Continued)

*Primary Examiner* — Lisa M Caputo
*Assistant Examiner* — Sharah Zaab
(74) *Attorney, Agent, or Firm* — Polsinelli PC

(57) ABSTRACT

The present invention discloses systems and methods for attenuation of coherent environmental and source-generated noise in a continuously recorded domain of seismic survey testing. Rather than applying universal de-noising techniques to conventional gathers after source de-blending, the system and methods discussed herein focus on estimating and removing noise directly on continuous records by leveraging the noise characteristics in the domain of natural recording. Such techniques may equally be applied to coherent environmental and source-generated noises on seismic data as well as other data and noise types. Driven by the noise types encountered in the field, the methods of noise attenuation may be based upon time-frequency domain rank reduction techniques. Further, to model signal and/or noise, low-rank approximations are employed in conjunction with other techniques such as operator design and unsupervised learning.

6 Claims, 17 Drawing Sheets

(56) References Cited

U.S. PATENT DOCUMENTS

| | | | |
|---|---|---|---|
| 8,619,497 B1 | 12/2013 | Sallas et al. | |
| 9,291,728 B2 | 3/2016 | Eick et al. | |
| 9,529,102 B2 | 12/2016 | Eick et al. | |
| 9,690,003 B2 | 6/2017 | Sallas | |
| 10,514,474 B2 | 12/2019 | Eick et al. | |
| 2006/0164916 A1* | 7/2006 | Krohn | G01V 1/37 367/41 |
| 2008/0205193 A1 | 8/2008 | Krohn et al. | |
| 2010/0128563 A1* | 5/2010 | Strobbia | G01V 1/30 367/49 |
| 2011/0082647 A1* | 4/2011 | Edme | G01V 1/30 702/14 |
| 2011/0128818 A1 | 6/2011 | Eick et al. | |
| 2012/0051181 A1 | 3/2012 | Eick et al. | |
| 2012/0281499 A1 | 11/2012 | Eick et al. | |
| 2013/0289960 A1* | 10/2013 | Grandi | G01V 1/308 703/10 |
| 2014/0133271 A1 | 5/2014 | Sallas | |
| 2014/0211590 A1 | 7/2014 | Sallas | |
| 2015/0063064 A1* | 3/2015 | van Groenestjin | G01V 1/362 367/21 |
| 2015/0078128 A1* | 3/2015 | Eick | G01V 1/005 367/37 |

OTHER PUBLICATIONS

"Li Chengbo et al: "Coherent noise attenuation using machine learning techniques for land seismic processing", SEG Technical Program Expanded Abstracts , pp. 4977-4981" (Year: 2019).*

Li Chengbo et al: "A low-rank approximation method for ice-break noise attenuation of simultaneous vibroseis data", SEG Technical Program Expanded Abstracts 2017,Aug. 17, 2017 (Aug. 17, 2017), pp. 4930-4934, XP055677908.

International Search Report for International Application No. PCT/IB2022/056390 dated Sep. 16, 2022 (3 pages).

Li Chengbo et al:"A direct noise attenuation approach in processing of land continuous records", The Leading Edge, vol. 40, No. 4, Apr. 1, 2021 (Apr. 1, 2021), pp. 288-296, XP055959105.

Li Chengbo et al:"Coherent noise attenuation using machine learning techniques for land seismic processing", SEG Technical Program Expanded Abstracts 2019, Aug. 10, 2019 (Aug. 10, 2019), pp. 4977-4981, XP055959108.

* cited by examiner

SYSTEMS AND METHODS FOR NOISE ATTENUATION OF LAND CONTINUOUS RECORDS

CROSS-REFERENCE TO RELATED APPLICATIONS

The present application claims priority to U.S. Provisional Patent Application No. 63/222,744, filed on Jul. 16, 2021, which is incorporated by reference in its entirety herein.

FIELD

Aspects of the present disclosure relate generally to systems and methods for seismic data processing and, more particularly, to attenuation of coherent environmental and source-generated noise in a continuously recorded domain.

BACKGROUND

Seismic surveys image the subsurface of the earth by introducing acoustic energy into the ground and recording the reflected energy that reflect from the layers of rock or other substances below the surface. In general, an energy source is typically positioned on or near the surface of the earth generates a seismic signal that travels into the earth, is partially reflected, and, upon its return, may be detected and recorded at many locations on the surface. The returning seismic energy may be recorded as a continuous signal representing displacement, velocity, acceleration, or other recorded variation as a function of time. Multiple combinations of energy source and sensor can be subsequently combined to create a near continuous image of the subsurface that lies beneath the survey area.

Seismic data often includes significant noise from various sources such that noise attenuation plays an important role in the processing of received seismic data, and in particular for land seismic data. For example, extreme land environments and/or surface activities during acquisition may cause unavoidable noise in the reflected signal, which may be orders of magnitude higher than the amplitude of reflections. Furthermore, heterogeneities in the near surfaces can generate strong back-scattering with complex behavior. Many processing steps hinge on the signal-to-noise ratio of the data such as multiple attenuation, deconvolution, velocity model building and imaging. Numerous efforts have been made to develop effective de-noising methods. However, most of such methods operate in conventional processing domains, such as common shots, receivers, midpoints, offsets, or a combination of these in order to present the coherency of signal. Often, noise characteristics are preserved in processed domains due to non-uniformity and missing data, resulting in less effective attenuation. A limited record length may also reduce the resolution and effectiveness of transform-based methods, such as time-frequency analysis.

It is with these observations in mind, among others, that various aspects of the present disclosure were conceived and developed.

SUMMARY

Implementations described and claimed herein address the foregoing problems by providing systems and methods for processing seismic survey data from a continuous seismic survey data record. In one implementation, the method attenuates a noise component of the continuous seismic survey data by slicing the continuous seismic survey data into a segment based on a sensor identifier and transforming the segmented seismic survey data into a time-frequency domain. The method further models the noise component of the transformed seismic survey data and applies a low-rank approximation to the continuous seismic survey data based on the modeled noise component. The attenuated continuous seismic survey data may then be de-blended to obtain subterranean features of a survey location.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for attenuation of coherent environmental and source-generated noise in a continuously recorded domain of seismic survey testing. Rather than applying universal de-noising techniques to conventional gathers after source de-blending, the system and methods discussed herein focus on estimating and removing noise directly on continuous records by leveraging the noise characteristics in the domain of natural recording. Such techniques may equally be applied to coherent environmental and source-generated noises on seismic source generated data as well as other data and noise types. Driven by the noise types encountered in the field, the methods of noise attenuation may be based upon time-frequency domain rank reduction techniques. Further, to model signal and/or noise, low-rank approximations are employed in conjunction with other techniques such as operator design and unsupervised learning. The noise attenuation methods are discussed herein with reference to three types of noise, ice-break noise, harmonic noise and narrow-band noise, which can be effectively removed in the domain of continuous records. However, other types of noise may similarly be identified and attenuated through the systems and methods presented. Other advantages will be apparent from the present disclosure.

Figure 1:
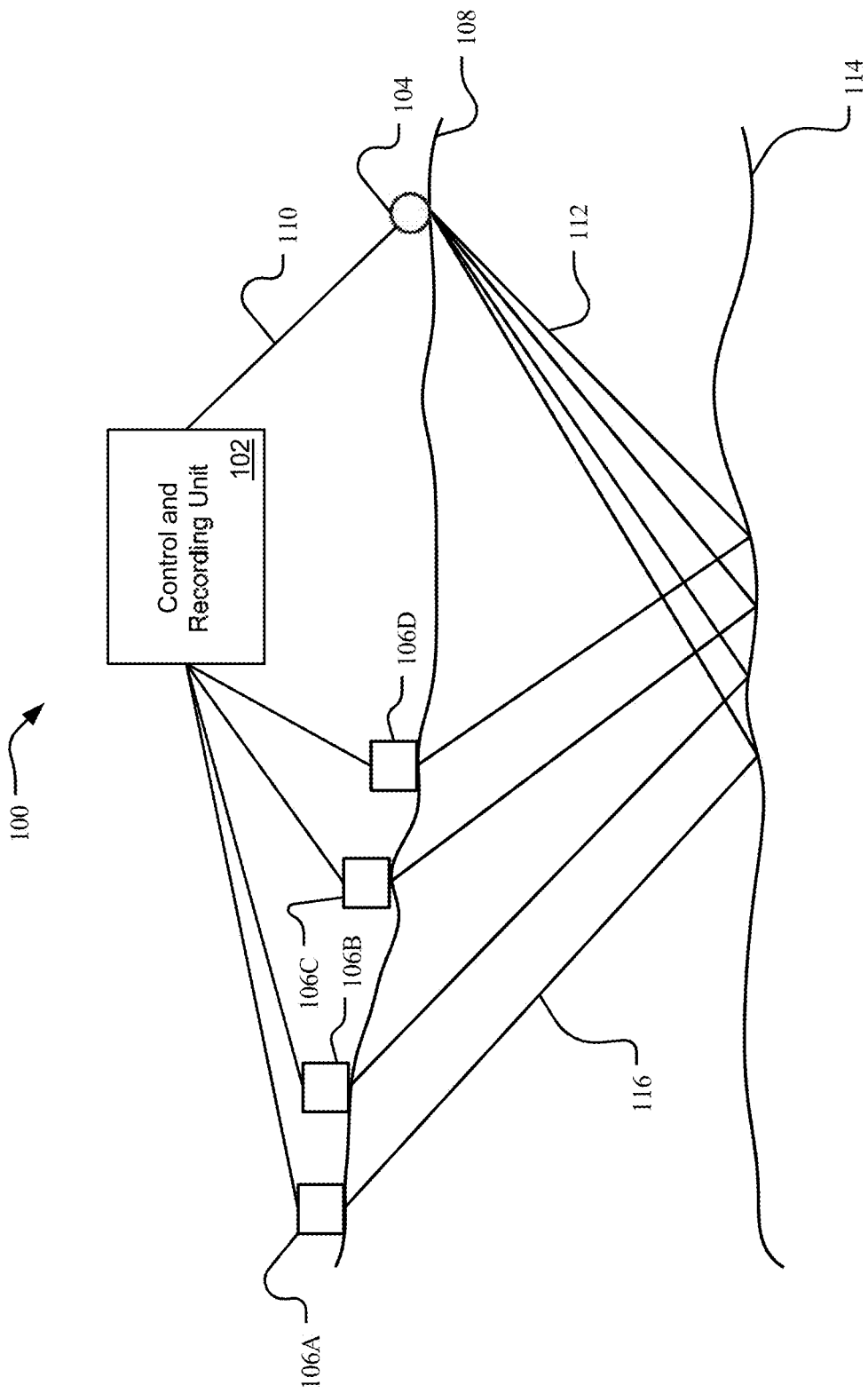
FIG. 1 is a schematic diagram of a land-based acquisition system that may implement various systems and methods discussed herein.

To begin a detailed discussion, reference is made to FIG. 1, which shows a standard seismic survey system 100. In one implementation, the survey system 100 may include a primary control and recording unit 102 for delivering commands to and receiving data signals from one or more remote units. In one particular example, an energy source 104, such as a vibrator truck or other vibration source, may be located on the ground 108 at a site and controlled by the control and recording unit 102. The control and recording unit 102 may also be connected to one or more receiver units 106A-D through wired or wireless communication. The receiver units 106A-D may be located with the central controller 102 or located in the field. The receiver units 106A-D may include any type of seismic sensors, such as a geophone, a microphone, an accelerometer-based detector, a hydrophone for wetlands, and the like. Each of the seismic sensors can provide digital or analog output signals regarding the seismic activity it receives.

In some instances, the seismic source 104 may include, but is not limited to, seismic vibrators, airguns, plasma shots, dynamite, and other sources known to one of ordinary skill in the art. Seismic vibrators include trucks, tractors, trailers, boats or ships, submarines, subterranean or other sources that have a base plate that can be brought into contact with the earth or water. A reaction mass is vibrated at varying frequencies against the baseplate to produce vibratory motion (transmit vibration energy) which travels downward into the earth via the base plate. A survey may be designed that uses multiple energy sources, each being activated simultaneously so that the recording instruments capture a composite signal with contributions from multiple vibrators.

In one example, the seismic energy source is distributed over a period of time. This distribution of energy over time creates a distinct signal, such as a sweep, in which the signal changes systematically from low frequency at the beginning to high frequency at the end of the source. Dependent upon the desired signal, number of seismic sources being conducted simultaneously, and transmission properties of the ground, different seismic sweep patterns may be developed. The source 104 may be linked to the central controller 102 via a two-way communication link 110, which may be analog or digital and wired or wireless. The data sent through the communication link 110 can include control settings, shot commands, location status, source available, source grade and other information useful in managing the survey. In some instances, the source 104 itself may include a global positioning system ("GPS") to provide accurate location information to the controller 102. The GPS can also be provided in other components located away from the central controller 102, for example the receiver units 106A-D.

In actual operation, the source 104 produces acoustic energy into the ground surface 108 of the earth to set up one or more acoustic waves 112 travelling generally downward into the earth. The acoustic waves 112 will partially reflect at an impedance change, such as at formation boundary 114, thus producing one or more reflected waves 116 that travels generally back toward the surface 108. The seismic sensor array 106A-D will then detect the reflected waves 116. The seismic sensor array 106A-D then transmits an analog or digital signal to the receiver units control and recording unit 102 for recording and further analysis. Some instances of further analysis of the obtained reflected energy is discussed herein, particularly techniques to attenuate noise in continuous records gathered by the control and recording unit 102. In many instances, the further analysis may be conducted off-site, remote from control and recording unit 102. In such instances, the control and recording unit 102 may transmit the recorded data to a processing computing device, either through a wired or wireless connection to the processing device. Further, although described above as being conducted on land, it should be appreciated that a similar seismic survey analysis may be conducted on water to detect land formations beneath the water.

Figure 2:
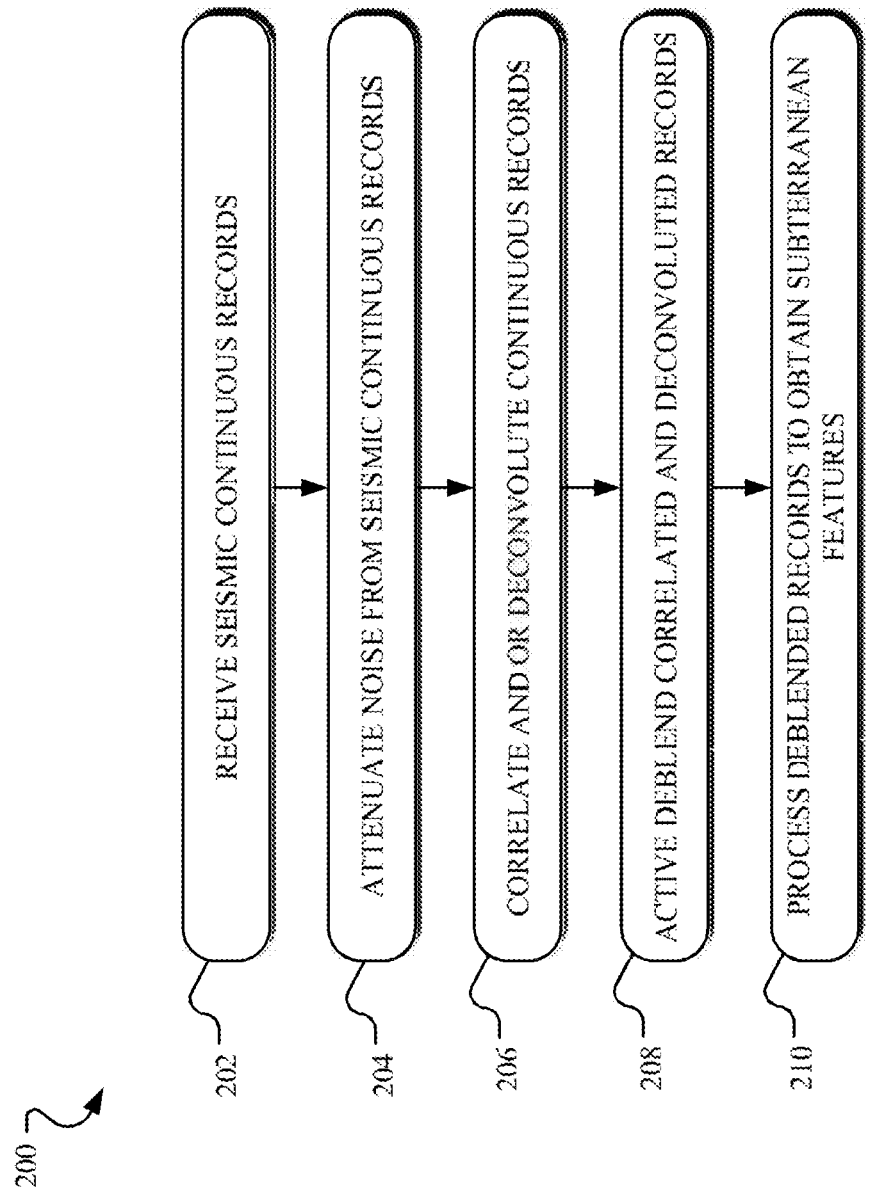
FIG. 2 illustrates example operations for processing land seismic data for subterranean feature analysis.

FIG. 2 illustrates example operations for processing land seismic data for subterranean feature analysis, such as the reflected waves 116 illustrated in the system 100 of FIG. 1. In some implementations, the operations of the method 200 of FIG. 2 may be performed by the control and recording unit 102 of the seismic survey system 100. In general, however, the operations may be performed by any computing device receiving seismic data of a seismic survey. The operations of the method 200 may be performed by a software program executed by the computing device, one or more hardware components, or a combination of software and hardware.

Beginning in operation 202, seismic data is received at the computing device. In some instances, the seismic data may be received as a continuous record of data as a series of seismic surveys are conducted by the system 100. In other instances, the seismic data may be received in segments of data corresponding to one or more seismic survey tests. As mentioned, the seismic data may be received at a control and reading unit 102 from one or more sensors 106A-D and correspond to an acoustic wave transmitted through a medium by source 104. The received data may be considered raw and/or uncorrelated as the data may comprise the data readings obtained from the sensors 106A-D in response to one or multiple seismic surveys. Each record is expected to contain sensor receiver 106A-D location information, and record start and end time. In some instances, the record start and/or end time may be obtained with at least microsecond precision. Source 104 information, such as source positioning and shot times, may also be included in the seismic data, typically delivered as meta-data in separate files using standard industry formats.

In operation 204, the seismic continuous records are processed to attenuate various noise components that may be introduced into the data from various sources. Several methods for attenuating noise from various sources are discussed in more detail below with reference to FIGS. 3-16. In general, the noise attenuation operation 204 is inserted to improve signal-to-noise ratio prior to sweep correlation and de-blending.

In operation 206, the continuous records may be correlated and/or de-convoluted. For example, a sweep correlation may be performed to collapse long sweeps into zero-phase wavelets and reduce the amount of blending between adjacent shots in time. However, one side effect to the correlation may be that noise recorded in the field may be spread out in time, contaminating nearby shots within the sweep length. In operation 208, an active de-blending of the correlated and de-convoluted data records may be executed. Such de-blending may be accomplished through any known or hereafter developed de-blending techniques. Finally, in operation 210, the de-blended correlated data records may be processed to determine subterranean or underwater features indicated by the reflected waves 116 received at the sensors 106A-D.

This type of blended source acquisition and processing has drawn great attention due to increased efficiency and reduced overall cost for acquiring seismic data. In particular, blended source acquisition reduces the need for a minimum time (usually determined by record length) between adjacent shots and allows multiple sources to be activated simultaneously and independently. Conventional processing simply converts continuous records into fixed length records using the source excitation time, and then applies traditional de-noising techniques to the fixed length records. As described herein, however, noise attenuation may be applied to continuous records, particularly land continuous records, although the techniques described may also be applied to aquatic continuous records. While more and more denoising solutions have been put forward, most of these methods operate in conventional processing domains, such as common shots, receivers, midpoints, offsets, or a combination of these. Seismic data organized in these domains are usually selected in order to present the coherency of signal. However, the noise characteristics may not be preserved due to non-uniformity and missing data, resulting in less effective attenuation. The limited record length also reduces the resolution and effectiveness of transform-based methods such as time-frequency analysis. Compared to such conventional common shot/receiver/midpoint/offset domains, continuous records represent the seismic data in the naturally recorded domain. This domain offers flexible and much longer record length to work with and, moreover, enables exploiting the characteristics of noise prior to correlation, shot slicing, or other pre-processing. The processes and techniques described herein may be applied to such continuous data for attenuating coherent environmental and source-generated noise. Incoherent noise in the record can be effectively handled by traditional noise suppression methods after de-blending. The processes and techniques remove coherent and/or incoherent noise which presents a distinguishable feature in a time-frequency different than the seismic signal.

Several techniques and methods for noise attenuation on continuously recorded land seismic data is presented and discussed herein. Instead of applying universal de-noising to conventional gathers after source de-blending, the techniques estimate and attempt to remove noise directly on continuous records by leveraging the noise characteristics in the domain of natural recording. The discussions herein are limited to coherent environmental and source-generated noises on seismic data, although similar ideas may be applied to other data and noise types. Driven by the noise types encountered in the field, the proposed methods and techniques are based upon time-frequency domain rank reduction and the separability of signal and noise is exploited through time-frequency analysis. To model signal and/or noise, low-rank approximations may be employed in conjunction with other techniques such as operator design and unsupervised learning. The techniques described may achieve effective attenuation of coherent noise without damage or distortion of primary reflections. Three particular sources of noise in seismic data are discussed below (ice-break noise, harmonic noise and narrow-band noise), although other sources of noise may also be identified, analyzed, and removed in the domain of continuous records.

Some environments present particular challenges in acquiring seismic data. For example, acquiring and processing seismic data from the Arctic presents a series of unique challenges, one of which involves handling ice-break noise. Ice breaks are strong impulsive events generated from the ice or frozen ground cracking during seismic acquisition operations. These events usually occur near lakes or rivers where the ice is partially grounded. The amplitude of ice-break noise can sometimes be orders of magnitude higher than the recorded signal from seismic sources. Conventional means of attenuating ice-break noise include stacking multiple sweeps for each single shot point to increase the signal-to-noise ratio. Modern acquisition in the Arctic often leverages point source and point receiver together with simultaneous shooting to achieve high density and high productivity. In this case, ice-break noise becomes more prominent due to lack of the stack power, and thus requires an approach to address the issue in processing.

Figure 3:
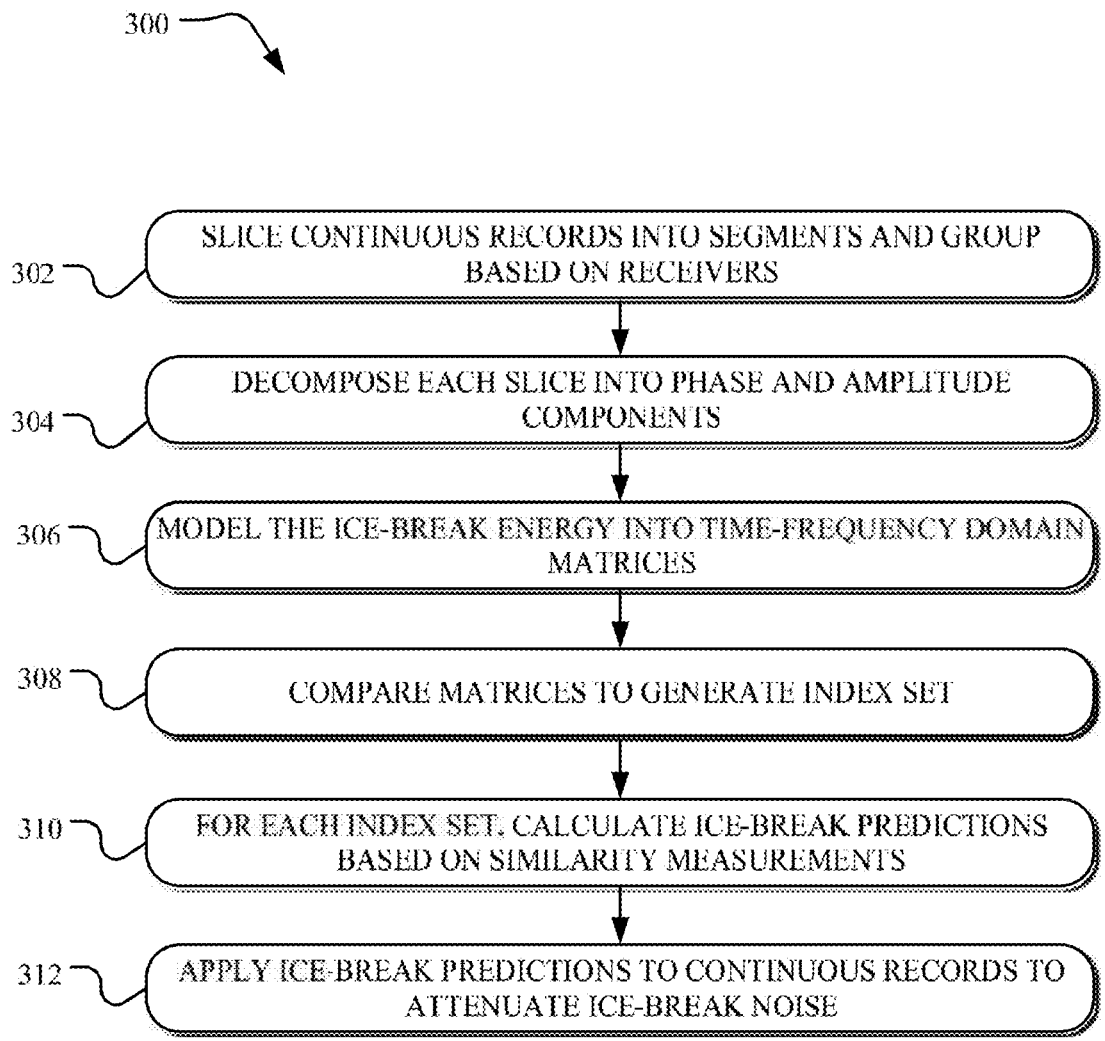
FIG. 3 illustrates example operations for attenuating noise attributable to ice-breakage from a land continuous record.

FIG. 3 illustrates example operations for attenuating noise attributable to ice-breakage from a land continuous record. As above, the operations of the displayed method 300 may be performed by the control and recording unit 102 of the seismic survey system 100 or any other computing device receiving seismic data of a seismic survey. The operations of the method 300 may be performed by a software program executed by the computing device, one or more hardware components, or a combination of software and hardware.

Figure 4:
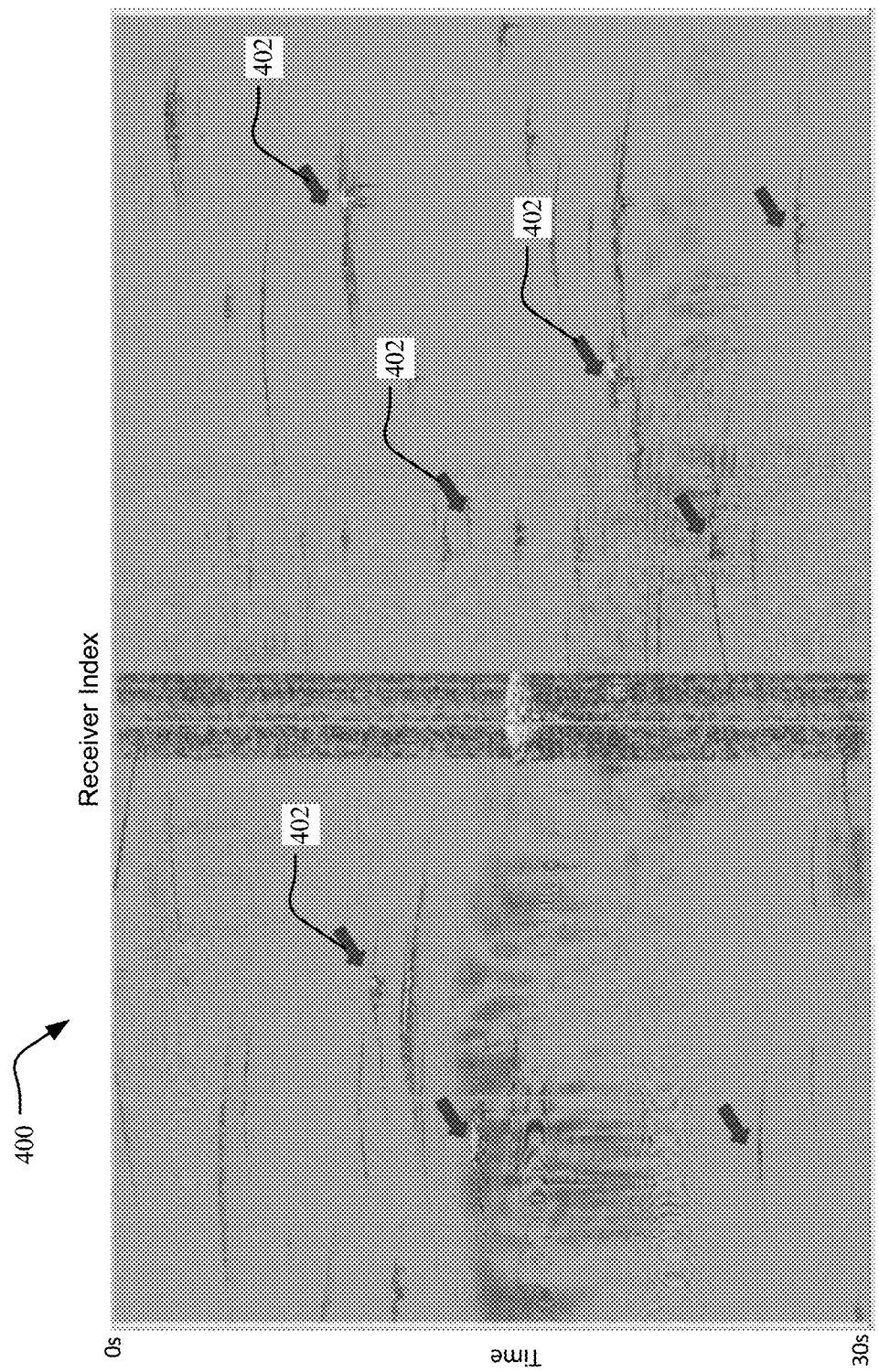
FIG. 4 shows an example of uncorrelated seismic time-segment data indicating instances of ice-break noise in the data.

The method 300 may begin in operation 302 in which the computing device slices the continuous seismic data (or other seismic data) into other long segments and group the segments based on the sensors 106A-D or receivers. More particularly, the computing device may form "time-segment gathers" by slicing continuous records into long segments and grouping receivers from the same time window together. The data may be sorted by record start time and receiver index information included in the continuous data. Each time-segment gather may share the same record start and end time, although other techniques for slicing the data into segments may be employed. As all the traces in a gather may share the same start time and if the receivers are sorted by position along a receiver line, point sources will be coherent in this domain. The gather can be either 'correlated' or 'uncorrelated', referring to whether the sweep energy has been collapsed or not. One example of an uncorrelated time-segment gather including ice-break noise is illustrated in FIG. 4. In particular, FIG. 4 illustrates an example of uncorrelated seismic time-segment graph 400 indicating instances of ice-break noise 402 in the data. The graph 400 illustrates seismic data for a 30 second segment, with arrows 402 indicating instances of ice-break noise included in the data. As shown, for uncorrelated time-segment gathers of data, ice-break noise is coherent, impulsive, and broad-band.

Figure 5:
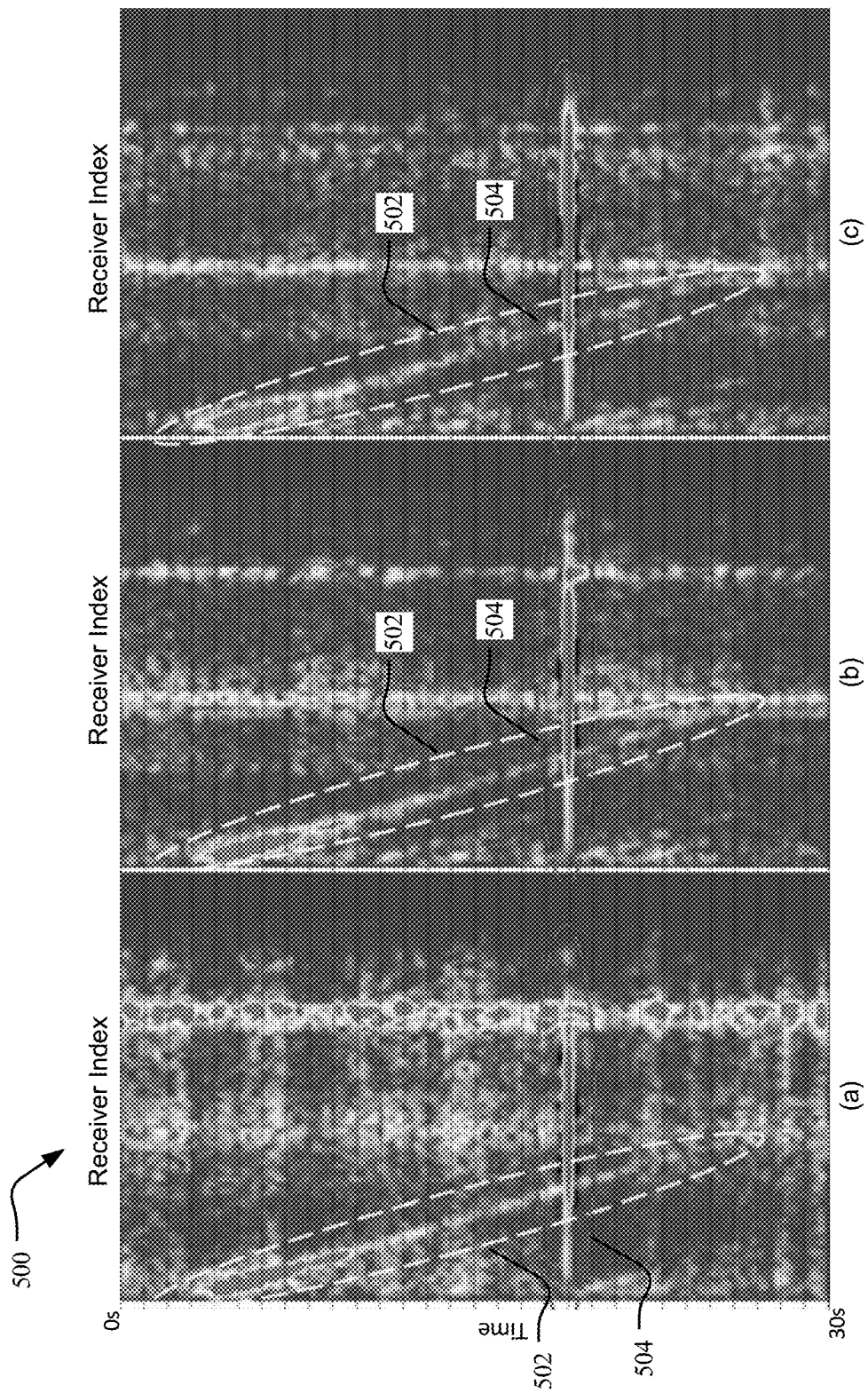
FIG. 5 shows an example time-frequency graph for three adjacent land continuous traces illustrating sweep signal and ice-break noise.

In operation 304, each trace of the segmented data may be decomposed into two-dimensional phase and amplitude components via generalized windowed transforms. The transform is invertible and low redundancy for constructing localized plane wave decompositions with high sparsity. The increased sparsity in the two-dimensional transform domain permits rank reduction techniques to separate noise from primary signal. In the following discussions, only the amplitude component may be operated on, with the phase component remaining intact. FIG. 5 shows an example time-frequency graph 500 for three adjacent land continuous traces (a-c) illustrating sweep signal and ice-break noise. In particular, the dipping events 502 circled in yellow correspond to the uncorrelated sweep signal, while the lateral events 504 circled in red for each tract a-c correspond to impulsive ice-break noise. The dipping angle difference between these two events provides a domain for feasible signal separation.

In operation 306, the computing device models the ice-break energy into time-frequency domain matrices by promoting its low-rank structure in the time-frequency domain. For example, let X be a time-frequency matrix with $n_1$ time windows and $n_2$ frequency bands. A rank-k approximation of X can be obtained by keeping only k leading singular values and setting the rest to zero. That is, $$\tilde{X} = \sum_{j=1}^{k} \sigma_j u_j v_j^T,$$

where $k<<\min(n_1,n_2)$, and $\sigma_j$, $u_j$ and $v_j$ represent the j-th largest singular value, left singular vector and right singular vector, respectively. Lateral coherency of ice-break energy creates a high degree of correlation from one frequency band to another, which gives rise to its low-rank structure. On the other hand, sweep signals that dip at an angle defined by the sweep parameters tend to exhibit higher rank, which may not be well approximated by its low-rank counterpart.

In operation 308, the two matrices generated above may be compared to generate an index set. In particular, the two matrices $\tilde{X}$ and X may be compared row by row to generate the "ice-break index set" $\Omega$. Specifically, let $\tilde{x}_i$ and $x_i$ represent the i-th row of $\tilde{X}$ and X, respectively. For each index i, we calculate the similarity measurement:

$$\cos\theta_i = \frac{<\tilde{x}_i, x_i>}{|\tilde{x}_i||x_i|},$$

and only add i into the index set $\Omega$ when the angle between two vectors, $\theta_i$, is smaller than a certain threshold $\epsilon$. This similarity measurement provides localized ice-break predictions in discrete time windows and prevents unnecessary signal leakage in the unaffected windows.

The robustness of the method 300 may be improved through exploitation of the coherency of ice break energy across adjacent receivers. For example, in operation 308, the computing device may, after obtaining the index sets for all traces, form a pick matrix by stacking all pick vectors $\Omega$ column by column. A median filter may then be applied to enhance the consistency of ice-break predictions. Note that the median filter acts on picks instead of actual prediction to avoid smearing. The filtered pick matrix constrains the noise prediction in two dimensional (2-D) localized time-space windows. The final ice-break noise model is attained in operation 310 by applying the filtered picks to the low-rank approximations. In general, a direct or adaptive subtraction between the input and the noise model suffices for attenuation.

Figure 6:
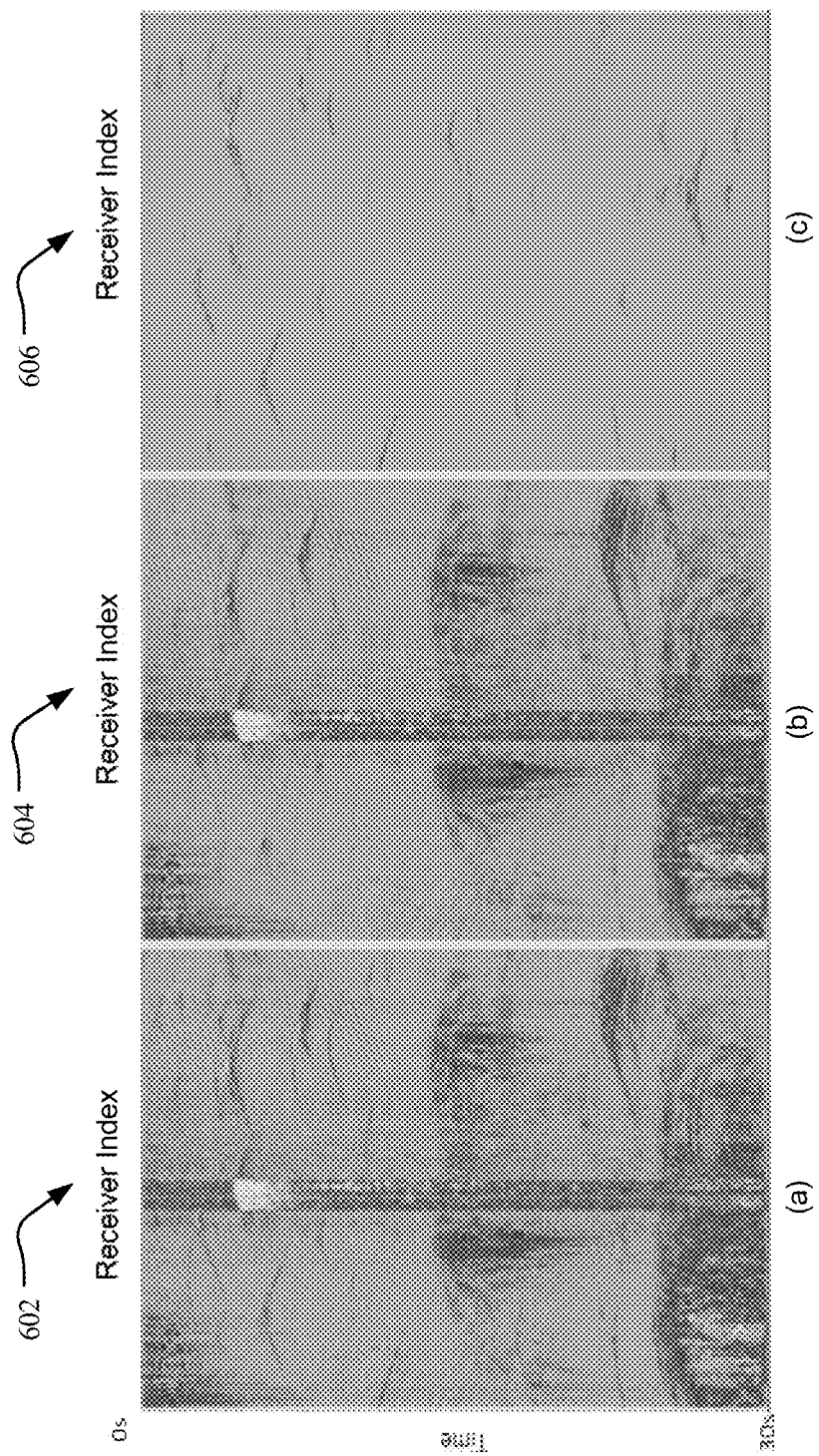
FIG. 6 shows three examples of time graph from a land-based acquisition system illustrating a data plot before ice-break noise attenuation, a data plot after ice-break noise attenuation, and a data plot of the difference.
Figure 7:
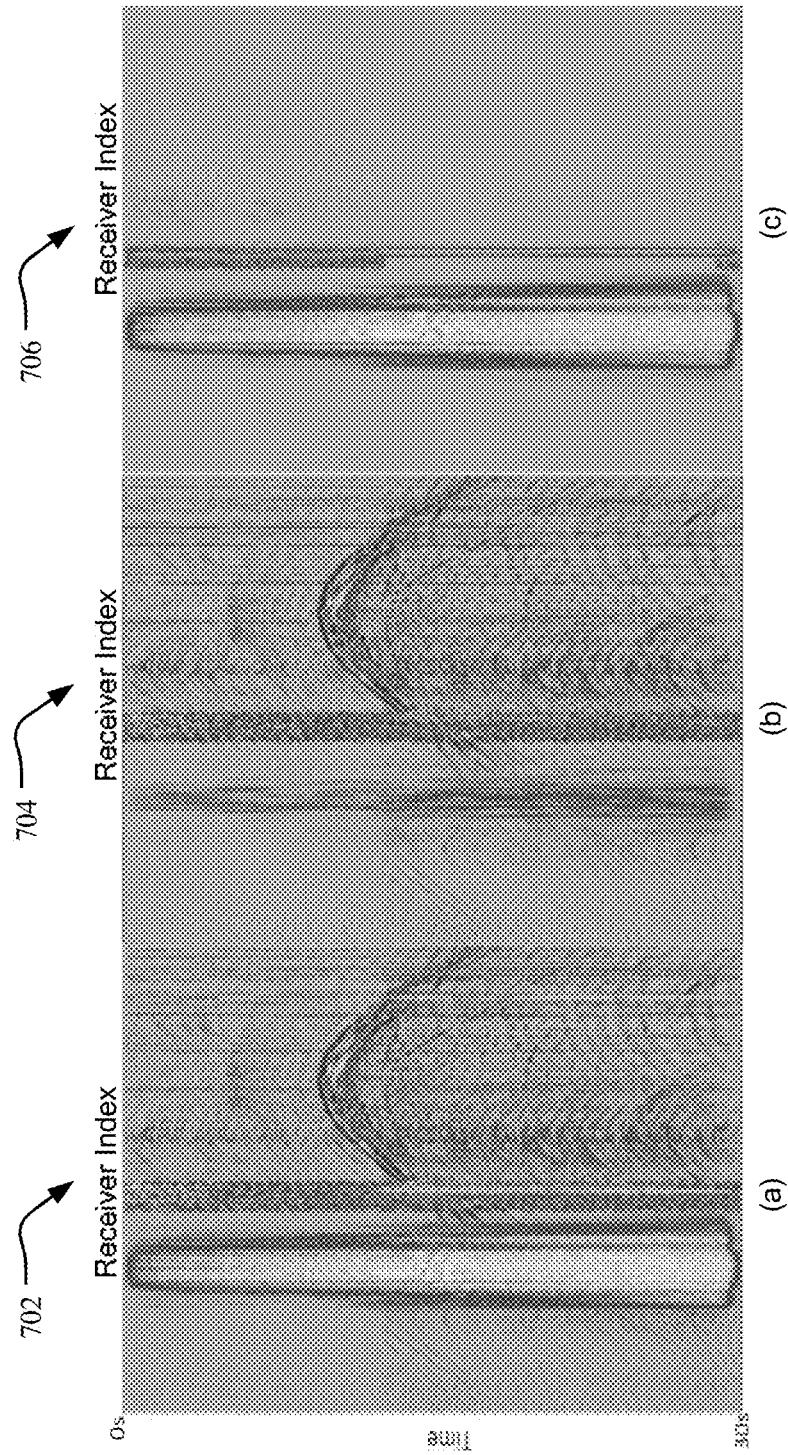
FIG. 7 shows three examples of time graph from a land-based acquisition system illustrating a shot gather plot before ice-break noise attenuation, a shot gather plot after ice-break noise attenuation, and a data plot of the difference.

FIGS. 6 and 7 illustrate application of the method 300 of FIG. 3 to example raw continuous record seismic data. In particular, no sweep correlation was performed in the field or prior to ice-break noise attenuation on the continuous data set. FIG. 6 shows three examples of time graph from a land-based acquisition system illustrating a data plot before ice-break noise attenuation (graph (a) 602), a data plot after ice-break noise attenuation (graph (b) 604), and a data plot of the difference (graph (c) 606). As shown in the difference graph 606, only the impulsive signal was removed from the data.

The data may further be correlated and deblended to display the results of the noise attenuation techniques. In particular, FIG. 7 shows three examples of time graph from a land-based acquisition system illustrating a shot gather plot before ice-break noise attenuation (graph (a) 702), a shot gather plot after ice-break noise attenuation (graph (b) 704), and a data plot of the difference (graph (c) 706). The three panels 702-706 from left to right show the shot gather without attenuating ice breaks, the same gather with attenuation in the continuously recorded domain, and the difference plot indicating effective denoising with no primary signal leakage. Note that the strong noise trend in graph 602 of FIG. 6 is associated with a single ice break spreading after correlation. Attenuation of ice breaks after correlation becomes a much more difficult task because of long time persistence of the noise after correlation. The benefits of applying this low-rank based method on continuous records is clearly illustrated in this example.

In addition to noise attributable to ice-breakage, harmonic distortion is a well-known effect that results in substantial differences between the pilot sweep and actual signal delivered into the earth. Many factors contribute to this effect including nonlinear coupling of the vibrator to the ground, inadequacy of the hydraulic and feedback systems, and others. When correlating with the pilot or reference sweep, harmonic noise will be formed as ghosts of primaries. The usage of up sweeps is widely accepted for land acquisition since the up-sweep harmonics correlate to negative time and have little impact on the primary shot. Yet, for high-productivity vibroseis techniques, such as slip-sweep and simultaneous acquisition, the time interval between two consecutive shots is often less than the sweep length, resulting in noise contamination of the earlier shot point with negative time correlated harmonics of the later one.

Figure 8:
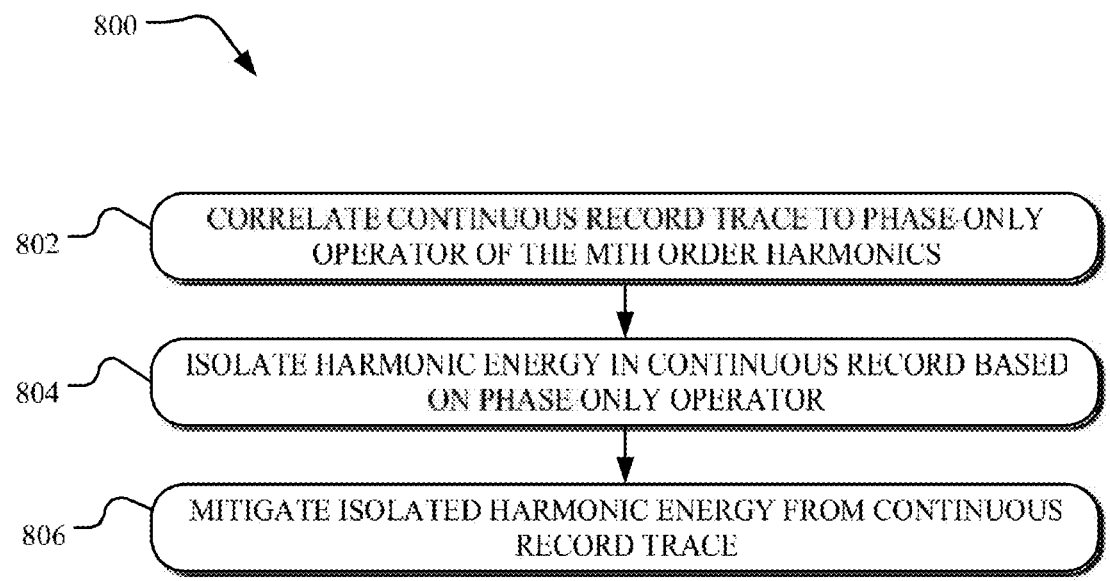
FIG. 8 illustrates example operations for attenuating harmonic noise from a land continuous record.

FIG. 8 illustrates example operations for attenuating harmonic noise from a land continuous record from multiple shots simultaneously. The operations of the displayed method 800 may be performed by the control and recording unit 102 of the seismic survey system 100 or any other computing device receiving seismic data of a seismic survey. The operations of the method 800 may be performed by a software program executed by the computing device, one or more hardware components, or a combination of software and hardware.

Beginning in operation 802, the computing device may correlate the continuous record trace to a phase-only operation of the mth order harmonics. In particular, for seismic data modeling, the notation may be modified such that:

$$x(t) = r(t) * s(t) \text{ and } s(t) = \sum_{m=0}^{M} s_m(t),$$

where x, r and s represent the vibroseis trace, earth reflectivity and harmonically distorted sweep (HDS) in the time domain. Moreover, the HDS is composed of the fundamental sweep $s_0(t)$ and the mth order harmonic $s_m(t)$ for m=1, 2, . . . , M. Note that this convolution model omits the receiver response and ambient noise terms to simplify the description.

Without loss of generality, the fundamental mode can be written as $$s_0(t) = \begin{cases} a_0(t) \exp(i 2\pi \Phi(t)) \text{ for } 0 \leq t \leq T \\ 0 \text{ otherwise} \end{cases},$$

where $\alpha_0(t)$ is the amplitude, $\Phi(t)$ is the instantaneous phase, and T is the sweep length by design. Consequently, the mth order harmonic of the fundamental $s_0$ can be expressed as $$s_m(t) = \begin{cases} a_m(t) \exp(i 2\pi (m+1) \Phi(t)) \text{ for } 0 \leq t \leq T \\ 0 \text{ otherwise} \end{cases}.$$

Let $\tilde{s}_m$ denote the phase-only operator associated with $s_m$, i.e., $$\tilde{s}_m(t) = \exp(i 2\pi (m+1) \Phi(t)).$$

By correlating the recorded trace with the phase-only operator $\tilde{s}_m$, we obtain $$x(t) \otimes \tilde{s}_m(t) = \left( r(t) * \sum_{j=0}^{M} s_j(t) \right) * \overline{\tilde{s}_m(-t)} = r(t) * w_m(t) + \sum_{j \neq m} r(t) * s_j(t) * \overline{\tilde{s}_m(-t)}.$$

Here $w_m(t)$ represents a zero-phase wavelet whose amplitude is given by $\alpha_m(t)$. The first term $r(t)*w_m(t)$ implies this correlation procedure focuses the energy associated with the mth order harmonic at the reflectors. In practice, harmonics from surface seismic mainly consist of ground roll or direct arrival. After correlation, the mth order harmonic becomes concentrated around time zero relative to each shot.

Figure 9:
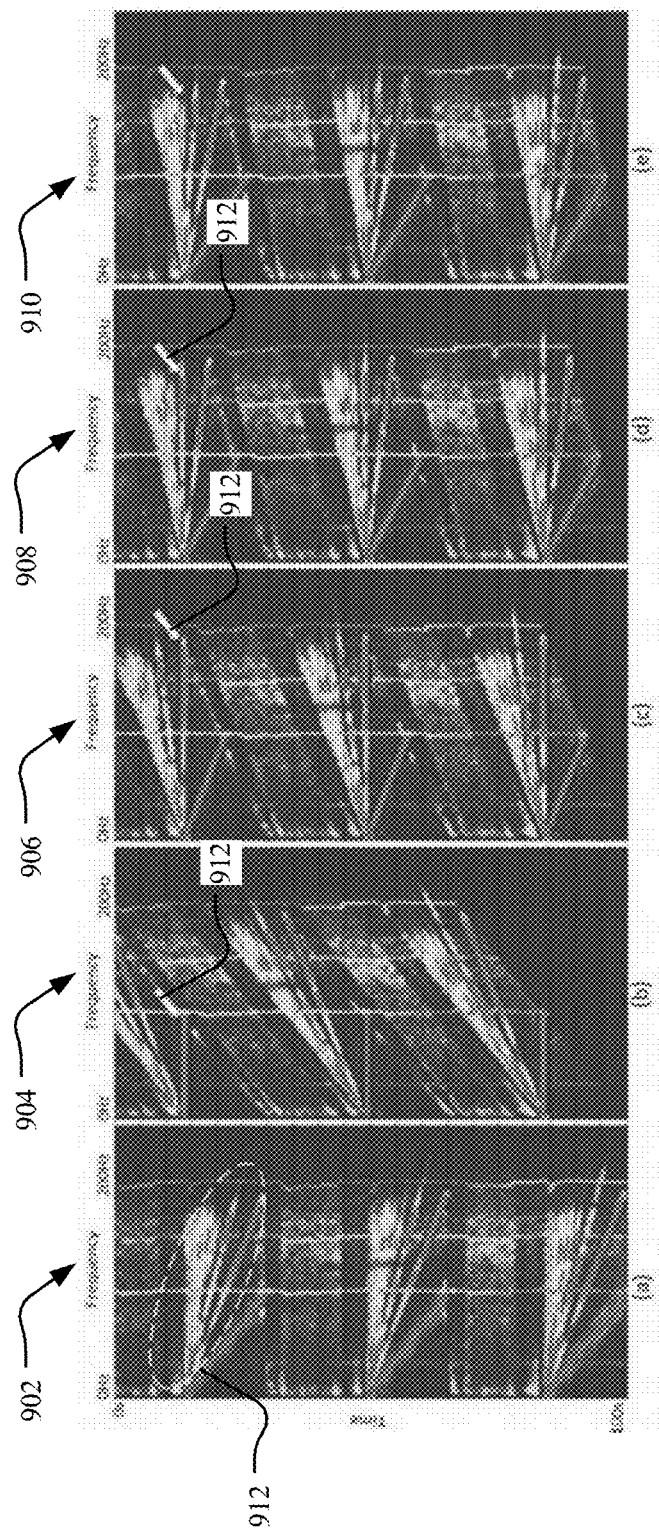
FIG. 9 shows an example of a time-frequency graph of an uncorrelated land continuous record data and several examples of a time-frequency graph of correlated land continuous record data with phase-only operators.

To illustrate the effect of correlation, FIG. 9 shows an example of a time-frequency graph 900 of an uncorrelated land continuous record data 902 and several examples of a time-frequency graph of correlated land continuous record data with phase-only operators 904-908. In particular, FIG. 9 illustrates a 100 second time segment 902 of the uncorrelated continuous record from a dataset (three shots included) with harmonics from the first shot 910 circled in yellow. Time segments 904-908 illustrate the results after correlating with the phase-only operator $\tilde{s}_m$ for m=0, 1, 2, 3, respectively. Note that the strong-amplitude portions of the fundamental, $1^{st}$, $2^{nd}$, and $3^{rd}$ harmonics have been "flattened" as pointed out by arrows 912. In particular, $\tilde{s}_0$ is commonly used as the focusing operator of the primaries. Once flattened, the harmonic energy can be isolated and estimated in this time-frequency domain by low-rank approximations, similar to the approach depicted previously for attenuating ice-break noise. In operation 806, the isolated harmonic energies may be mitigated up to m orders of harmonics through a repeated estimation-and-subtraction process for m+1 times, removing the fundamental and mth order harmonic sequentially. Energy associated with the fundamental mode may be added back in the end to retain primary reflections.

Figure 10:
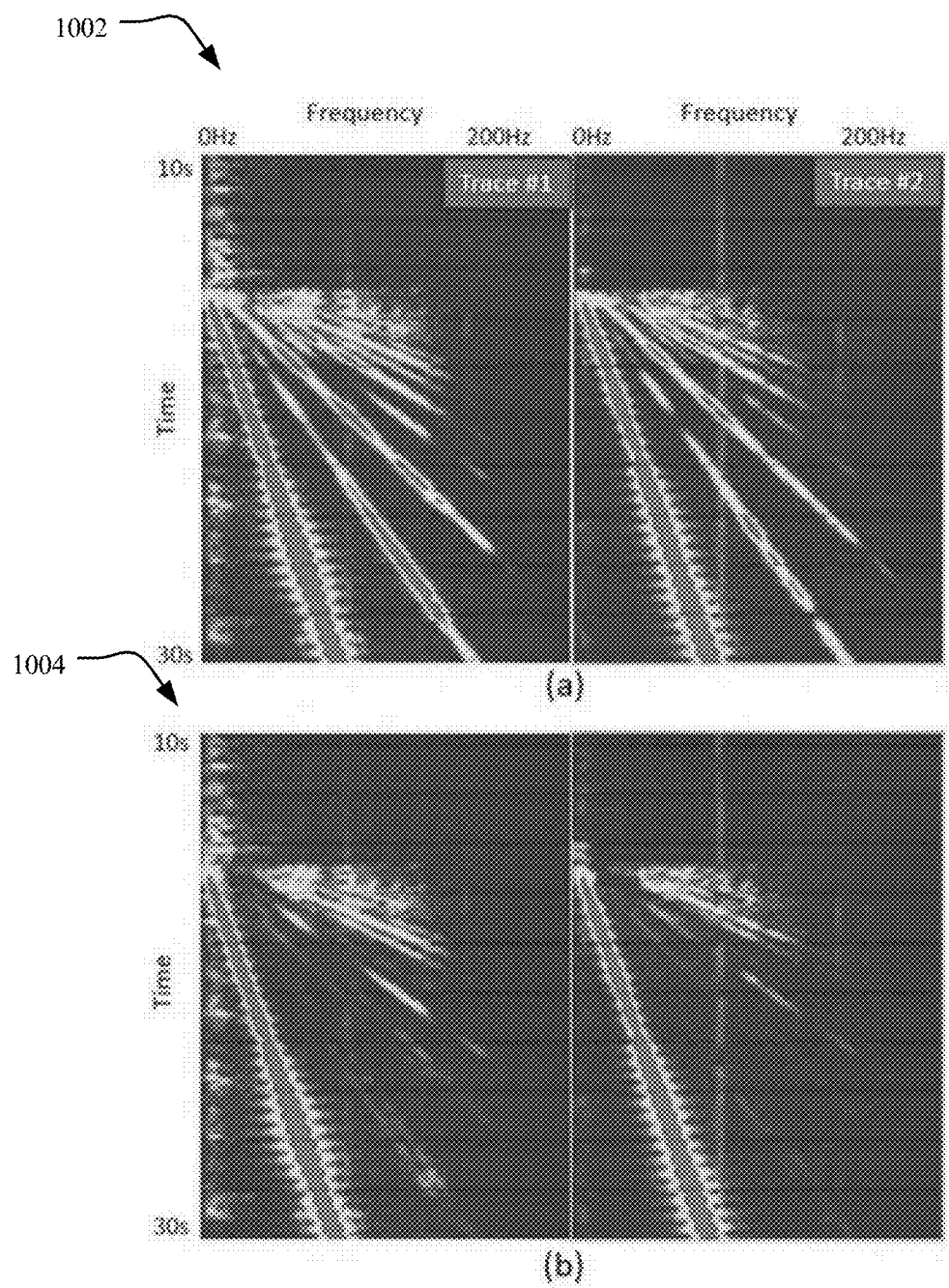
FIG. 10 shows a time-frequency graph from a land-based acquisition system illustrating two traces before harmonic noise attenuation and a time-frequency graph from a land-based acquisition system illustrating two traces after harmonic noise attenuation.

FIG. 10 shows a time-frequency graph from a land-based acquisition system illustrating two traces one before harmonic noise attenuation 1002 and a time-frequency graph from a land-based acquisition system illustrating two traces after harmonic noise attenuation 1004. The provided graphs illustrate the above method 800 of FIG. 8 used to estimate and attenuate the first four orders of harmonics on an example raw continuous record dataset. The data is first transformed to time-frequency domain for isolating and estimating the harmonic energy sequentially. Graphs 1002 and 1004 zoom in on a 20 second time segment and compares the data before and after harmonic attenuation in the time-frequency domain. In particular, graph 1002 illustrates a time-frequency analysis of two traces before harmonic noise attenuation and graph 1004 illustrates the time-frequency analysis of the two traces after harmonic noise attenuation through the method 800 described above. Note that the strong harmonics from linear up sweeps have been eliminated through the process while preserving the primaries.

Figure 11:
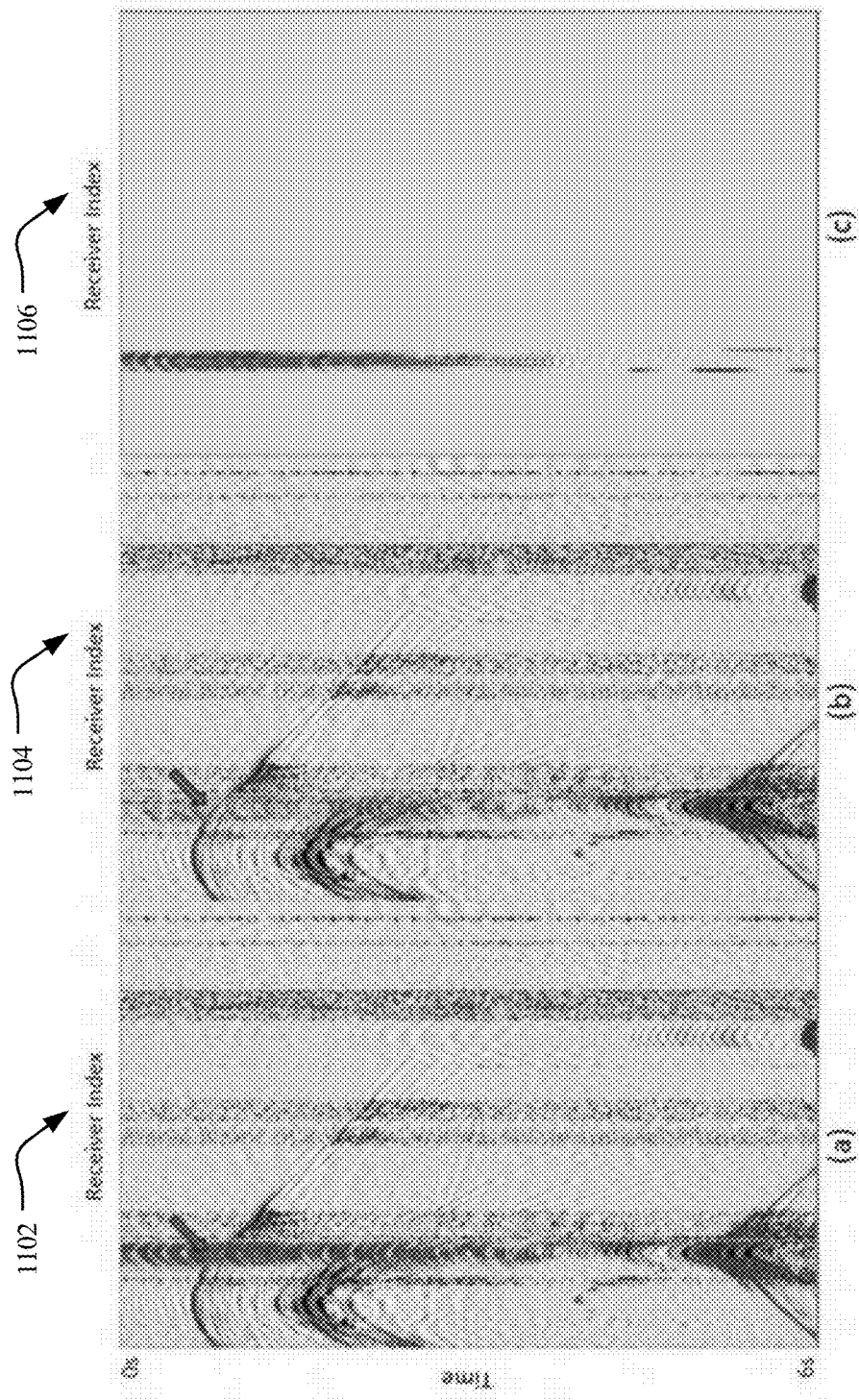
FIG. 11 shows three examples of a correlated time graph from a land-based acquisition system illustrating a data plot without harmonic noise attenuation, a data plot with harmonic attenuation, and a data plot of the difference.

FIG. 11 shows three examples of a correlated time graph from a land-based acquisition system illustrating a data plot without harmonic noise attenuation (graph (a) 1102), a data plot with harmonic attenuation (graph (b) 1104), and a data plot of the difference (graph (c) 1106). The three panels 1102-1106 from left to right show the correlated time-segment gather without harmonic attenuation, the same gather with attenuation, and the estimated harmonics after correlation. In graph 1102, two shots are blended within 6 seconds and the former shot was contaminated by the correlated harmonics of the later one. After attenuation, the underlying reflection energy has been revealed as shown in graph 1104. The difference plot 1106 illustrates that the proposed method is capable of separating harmonic noise from reflections, without imposing muting which would damage primary signals for cases where time separation between shots is less than the sweep length.

Figure 12:
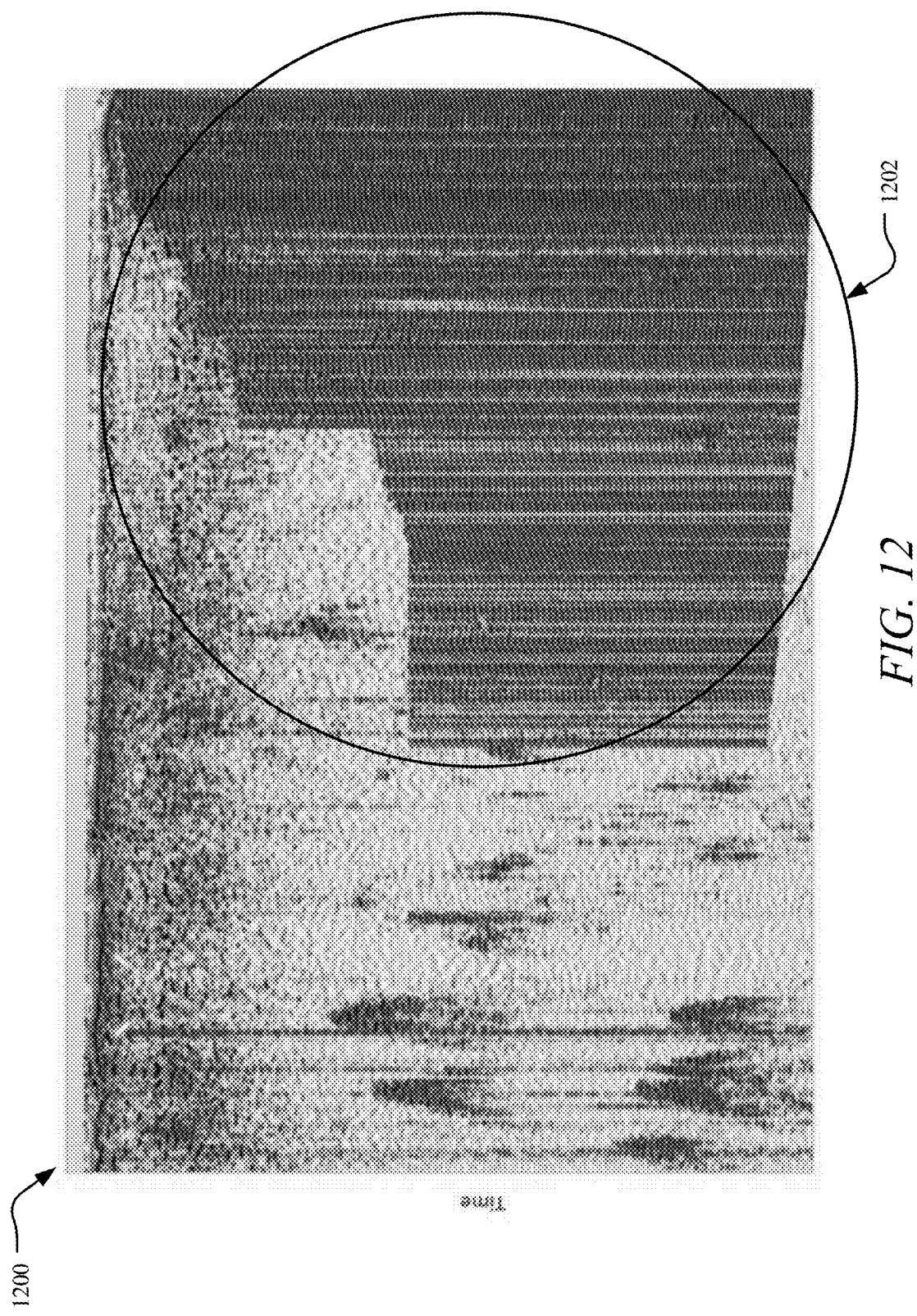
FIG. 12 shows an example of uncorrelated seismic time-segment data indicating instances of coherent noise in the data due to drilling activities.

Noise from surrounding environment and surface activities is unavoidable during land acquisition. In particular, coherent noise frequently degrades the quality of data to such an extent that special efforts are required in processing to reduce it. For instance, acquiring seismic near active producing fields or busy roads could result in excessive amount of narrow-band noise from drilling and moving vehicles. FIG. 12 shows an example of seismic data that includes narrow-band noise (illustrated in circle 1202) from noise generated from nearby pumpjacks despite the high fold. By examining the raw gathers, this localized noise may exhibit strong coherent amplitudes with a narrow bandwidth of 1 Hz to 2.5 Hz. The center frequency of the noise 1202 may shift between 20 Hz and 45 Hz, which makes conventional filtering methods such as notch filter less effective. The advantages of long record length and a narrow-band noise feature may be utilized to automatically detect and attenuate the noise attributable to the pumpjacks.

Figure 13:
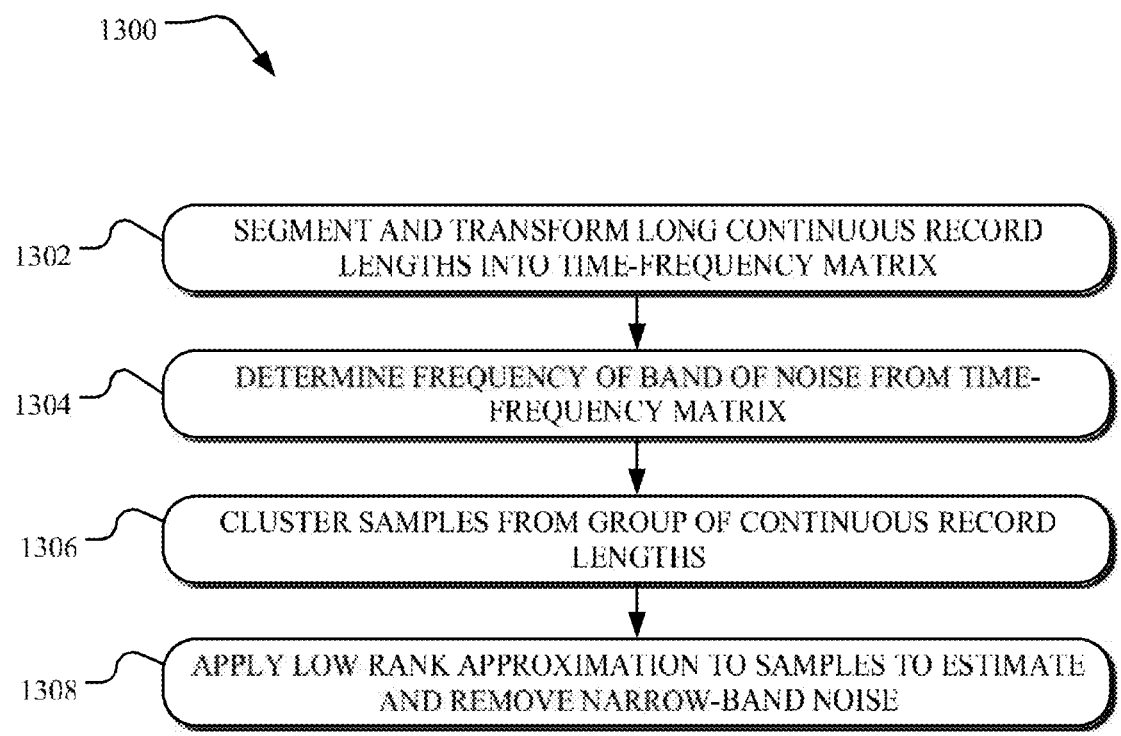
FIG. 13 illustrates example operations for attenuating narrow-band noise from a land continuous record.

FIG. 13 illustrates example operations for attenuating narrow-band noise from a land continuous record. Similar to above, the operations of the displayed method 1300 may be performed by the control and recording unit 102 of the seismic survey system 100 or any other computing device receiving seismic data of a seismic survey. The operations of the method 1300 may be performed by a software program executed by the computing device, one or more hardware components, or a combination of software and hardware.

Beginning in operation 1302, the continuous data records may be segments and transformed for time-frequency analysis. As the noise is usually continuous in time, we choose to operate directly on the continuous records. Long record lengths are used to improve frequency domain resolution of these noise types. One example of segmented and transformed time-frequency data is illustrated in graph 1402 of FIG. 14. As shown in this illustration 1402 of the time-frequency transformed data, the noise appears as vertical strips with large amplitudes, illustrated by arrows 1406.

After generating the time-frequency matrix, each frequency band may be identified as a "sample" in operation 1304. Further, the samples from a group of records may be collected for clustering in operation 1306. The premise is that the noisy bands can be automatically identified and put into a set of clusters given a sufficient number of samples. To attain the identification and clustering of the samples, an algorithm may be modified from K-means to perform unsupervised clustering and utilized to predict noisy locations and corresponding frequency bands. The algorithm tends to be effective because the statistical attributes of samples affected by narrow-band noise are markedly different from unaffected samples.

In the time-frequency domain, the uncorrelated shots dip at an angle determined by the sweep parameters, whereas narrow-band noise appears as vertical events which promote the low-rank structure. Once properly labeled, a low-rank approximation technique as described previously may be applied to the data in operation 1308 to estimate and subtract the narrow-band noise. Note that the method 1300 is inapplicable after sweep correlation, since both correlated shots and narrow-band noise possess a similar low-rank structure in the time-frequency domain.

Figure 14:
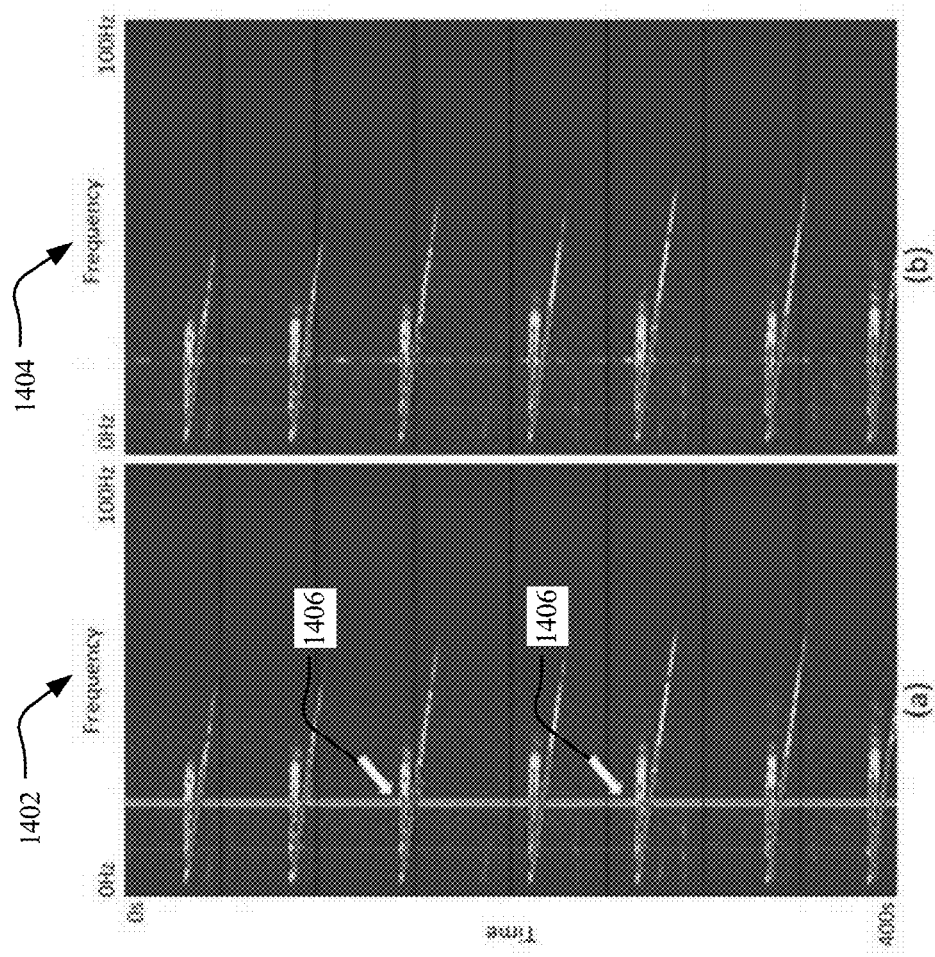
FIG. 14 shows a time-frequency graph from a land-based acquisition system illustrating of an uncorrelated continuous record and a time-frequency graph from a land-based acquisition system illustrating the record after narrow-band noise attenuation.
Figure 15:
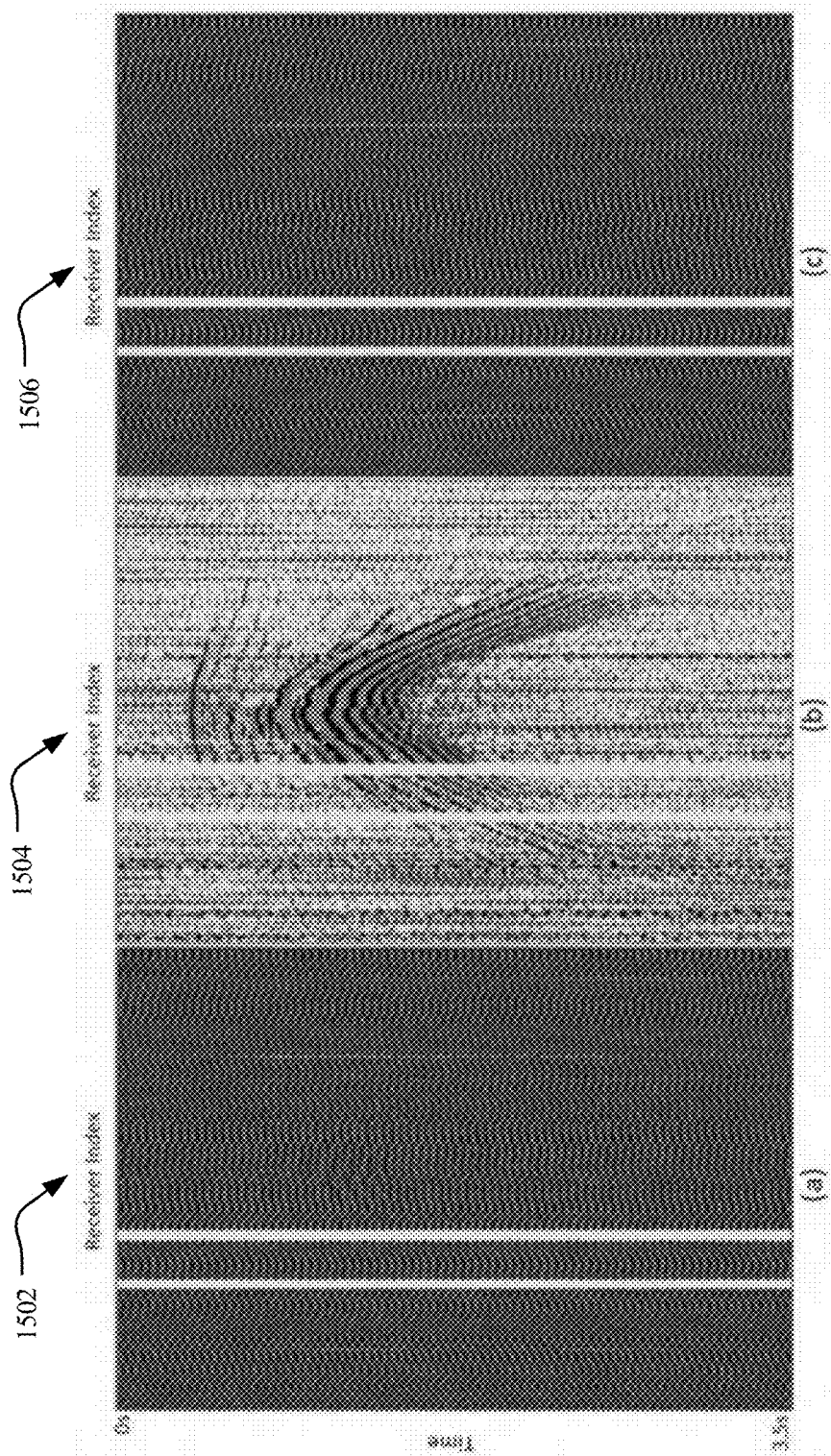
FIG. 15 shows three examples of time graph from a land-based acquisition system illustrating a shot gather plot without narrow-band noise attenuation, a shot gather plot with narrow-band noise attenuation, and a data plot of the difference.

FIG. 14 shows a time-frequency graph from a land-based acquisition system illustrating of an uncorrelated continuous record and a time-frequency graph from a land-based acquisition system illustrating the record after narrow-band noise attenuation. In general, the graphs 1402, 1404 compares before and after attenuation in the time-frequency domain for a 400 second time segment. In the example graphs 1402, 1404, a narrow-band noise trend centered at 22 Hertz is illustrated, pointed by arrows 1406. Through the attenuation method 1300 discussed above, this narrow-band noise is eliminated without compromising any sweep signal, as shown in graph 1404. FIG. 15 shows three examples of time graph from a land-based acquisition system illustrating a shot gather plot 1502 without narrow-band noise attenuation, a shot gather plot 1504 with narrow-band noise attenuation, and a data plot 1506 of the difference. As can be seen for this particular shot, over 99% of the energy came from narrow-band noise and the sweep signal was only revealed after removing the noise.

Figure 16:
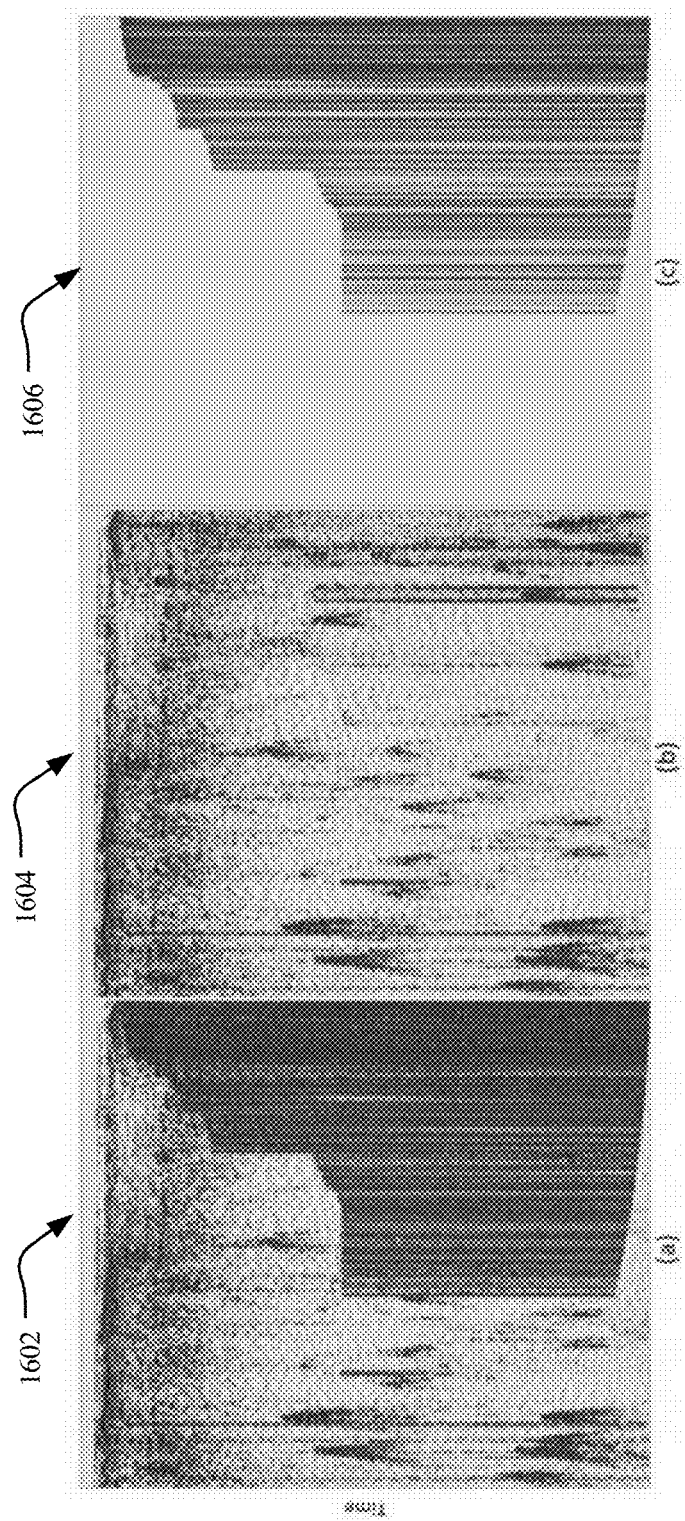
FIG. 16 shows three examples of time graph from a land-based acquisition system illustrating a raw stacked section plot without narrow-band noise attenuation, a raw stacked section plot with narrow-band noise attenuation, and a data plot of the difference.

Further analysis of the effectiveness of the narrow-band noise attenuation approach discussed above is illustrated through the moveout corrections and straight stacking techniques illustrated in FIG. 16. In particular, graph 1602 of FIG. 16 shows a stacked inline section from raw data suggesting strong coherent noise on the right side of the graph. Graph 1604 shows the same section with narrow-band noise attenuation, and the difference is shown in graph 1606. It is illustrated that the method has effectively removed the noise and significantly improved the signal-to-noise ratio of the data. The method 1300 may also be repeated to attenuate vehicle and engine noise, which was a secondary noise source compared to the noise from drilling and pumping.

Leveraging the continuously recorded domain for land seismic data, three methods based upon time-frequency analysis to attenuate coherent environmental and source-generated noise are discussed herein. The methods take advantage of the separability of signal and noise in the time-frequency domain and combine rank reduction techniques with operator design or unsupervised learning. Although three types of coherent noise were discussed in detail, including ice-break noise, harmonic noise and narrow-band noise, other types of noise in the data may also be attenuated from a continuous record. The results from the proposed methods indicate that a good balance between noise reduction and signal preservation can be achieved by operating directly on raw continuous records. This natural acquisition domain offers a distinct viewpoint and opens new opportunities for pre-processing of land seismic data.

Figure 17:
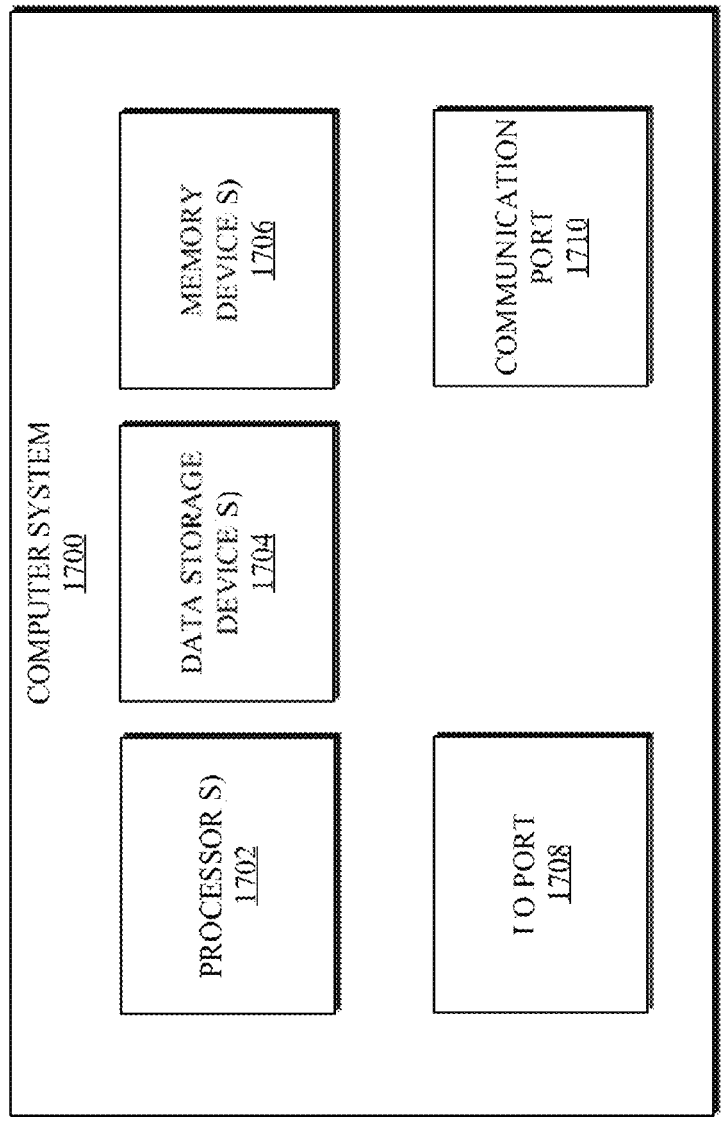
FIG. 17 shows an example computing system that may implement various systems and methods discussed herein.

Referring to FIG. 17, a detailed description of an example computing system 1700 having one or more computing units that may implement various systems and methods discussed herein is provided. The computing system 1700 may be applicable to the control and recording unit 102 of FIG. 1 and other computing or network devices. It will be appreciated that specific implementations of these devices may be of differing possible specific computing architectures not all of which are specifically discussed herein but will be understood by those of ordinary skill in the art.

The computer system 1700 may be a computing system is capable of executing a computer program product to execute a computer process. Data and program files may be input to the computer system 1700, which reads the files and executes the programs therein. Some of the elements of the computer system 1700 are shown in FIG. 17, including one or more hardware processors 1702, one or more data storage devices 1704, one or more memory devices 1708, and/or one or more ports 1708-1710. Additionally, other elements that will be recognized by those skilled in the art may be included in the computing system 1700 but are not explicitly depicted in FIG. 17 or discussed further herein. Various elements of the computer system 1700 may communicate with one another by way of one or more communication buses, point-to-point communication paths, or other communication means not explicitly depicted in FIG. 17.

The processor 1702 may include, for example, a central processing unit (CPU), a microprocessor, a microcontroller, a digital signal processor (DSP), and/or one or more internal levels of cache. There may be one or more processors 1702, such that the processor 1702 comprises a single central-processing unit, or a plurality of processing units capable of executing instructions and performing operations in parallel with each other, commonly referred to as a parallel processing environment.

The computer system 1700 may be a conventional computer, a distributed computer, or any other type of computer, such as one or more external computers made available via a cloud computing architecture. The presently described technology is optionally implemented in software stored on the data storage device(s) 1704, stored on the memory device(s) 1706, and/or communicated via one or more of the ports 1708-1710, thereby transforming the computer system 1700 in FIG. 17 to a special purpose machine for implementing the operations described herein. Examples of the computer system 1700 include personal computers, terminals, workstations, mobile phones, tablets, laptops, personal computers, multimedia consoles, gaming consoles, set top boxes, and the like.

The one or more data storage devices 1704 may include any non-volatile data storage device capable of storing data generated or employed within the computing system 1700, such as computer executable instructions for performing a computer process, which may include instructions of both application programs and an operating system (OS) that manages the various components of the computing system 1700. The data storage devices 1704 may include, without limitation, magnetic disk drives, optical disk drives, solid state drives (SSDs), flash drives, and the like. The data storage devices 1704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1706 may include volatile memory (e.g., dynamic random-access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1704 and/or the memory devices 1706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1700 includes one or more ports, such as an input/output (I/O) port 1708 and a communication port 1710, for communicating with other computing, network, or reservoir development devices. It will be appreciated that the ports 1708-1710 may be combined or separate and that more or fewer ports may be included in the computer system 1700.

The I/O port 1708 may be connected to an I/O device, or other device, by which information is input to or output from the computing system 1700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1700 via the I/O port 1708. Similarly, the output devices may convert electrical signals received from computing system 1700 via the I/O port 1708 into signals that may be sensed as output by a human, such as sound, light, and/or touch. The input device may be an alphanumeric input device, including alphanumeric and other keys for communicating information and/or command selections to the processor 1702 via the I/O port 1708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1700 via the I/O port 1708. For example, an electrical signal generated within the computing system 1700 may be converted to another type of signal, and/or vice-versa. In one implementation, the environment transducer devices sense characteristics or aspects of an environment local to or remote from the computing device 1700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1700, such as, physical movement of some object (e.g., a mechanical actuator), heating or cooling of a substance, adding a chemical substance, and/or the like.

In one implementation, a communication port 1710 is connected to a network by way of which the computer system 1700 may receive network data useful in executing the methods and systems set out herein as well as transmitting information and network configuration changes determined thereby. Stated differently, the communication port 1710 connects the computer system 1700 to one or more communication interface devices configured to transmit and/or receive information between the computing system 1700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1710 to communicate one or more other machines, either directly over a point-to-point communication path, over a wide area network (WAN) (e.g., the Internet), over a local area network (LAN), over a cellular (e.g., third generation (3G) or fourth generation (4G) or fifth generation (5G) network), or over another communication means. Further, the communication port 1710 may communicate with an antenna or other link for electromagnetic signal transmission and/or reception.

In an example implementation, methods for attenuation of coherent environmental and source-generated noise in seismic data in a continuously recorded domain, and software and other modules and services may be embodied by instructions stored on the data storage devices 1704 and/or the memory devices 1706 and executed by the processor 1702. The computer system 1700 may be integrated with the command and recording unit 102, or may be part of any system receiving seismic data of a seismic survey.

The system set forth in FIG. 17 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for processing seismic survey data, the method comprising:
    obtaining, at a computing device, continuous seismic survey data of a survey location, the continuous seismic survey data collected by a seismic surveying system including a seismic source and one or more seismic sensors, each seismic sensor having a sensor identifier;
    generating segmented seismic survey data by slicing the continuous seismic survey data into one or more segments grouped by the sensor identifier;
    generating transformed seismic survey data by transforming the segmented seismic survey data into a time-frequency domain;
    determining, based on the transformed seismic survey data, a phase-only operator of an mth order harmonic of a fundamental, wherein m=1, 2, . . . , M;
    correlating the segmented seismic survey data with the phase-only operator of the mth order harmonic;
    isolating and estimating a harmonic noise component of the mth order harmonic based on the phase-only operator of the mth order harmonic by applying a low-rank approximation to the continuous seismic survey data;
    generating attenuated continuous seismic survey data by attenuating the transformed seismic survey data using the harmonic noise component of the mth order harmonic;
    determining one or more subterranean features of the survey location using the attenuated continuous seismic survey data; and
    plotting the one or more subterranean features of the survey location identified based on the attenuated continuous seismic survey data.

2. The method of claim 1, wherein attenuating the transformed seismic survey data using the harmonic noise component of the mth order harmonic comprises subtracting the harmonic noise component of the mth order harmonic from the transformed seismic survey data.

3. The method of claim 2, comprising removing the fundamental and a respective harmonic noise of the mth order harmonics sequentially by repeating m+1 times, for m=1, 2, . . . , M, for steps of isolating, estimating and subtracting.

4. The method of claim 3, comprising retaining primary reflections by adding back the fundamental.

5. One or more tangible non-transitory computer-readable storage media storing computer-executable instructions for performing a computer process on a computing system, the computer process comprising:
    obtaining continuous seismic survey data of a survey location, the continuous seismic survey data collected by a seismic surveying system including a seismic source and one or more seismic sensors, each seismic sensor having a sensor identifier;
    generating segmented seismic survey data by slicing the continuous seismic survey data into one or more segments grouped by the sensor identifier;
    generating transformed seismic survey data by transforming the segmented seismic survey data into a time-frequency domain;
    determining, based on the transformed seismic survey data, a phase-only operator of an mth order harmonic of a fundamental, wherein m=1, 2, . . . , M;
    correlating the segmented seismic survey data with the phase-only operator of the mth order harmonic;
    isolating and estimating a harmonic noise component of the mth order harmonic based on the phase-only operator of the mth order harmonic by applying a low-rank approximation to the continuous seismic survey data;
    generating attenuated continuous seismic survey data by attenuating the transformed seismic survey data using the harmonic noise component of the mth order harmonic;
    determining one or more subterranean features of the survey location using the attenuated continuous seismic survey data; and plotting the one or more subterranean features of the survey location identified based on the attenuated continuous seismic survey data.

6. A system adapted to carry out a method processing seismic survey data, the system comprising:
  a computing device having at least one processor configured to:
    obtain continuous seismic survey data of a survey location, the continuous seismic survey data collected by a seismic surveying system including a seismic source and one or more seismic sensors, each seismic sensor having a sensor identifier;
    generating segmented seismic survey data by slicing the continuous seismic survey data into one or more segments grouped by the sensor identifier;
    generating transformed seismic survey data by transforming the segmented seismic survey data into a time-frequency domain;
    determining, based on the transformed seismic survey data, a phase-only operator of an mth order harmonic of a fundamental, wherein m=1, 2, . . . , M;
    correlating the segmented seismic survey data with the phase-only operator of the mth order harmonic;
    isolating and estimating a harmonic noise component of the mth order harmonic based on the phase-only operator of the mth order harmonic by applying a low-rank approximation to the continuous seismic survey data;
    generating attenuated continuous seismic survey data by attenuating the transformed seismic survey data using the harmonic noise component of the mth order harmonic;
    determining one or more subterranean features of the survey location using the attenuated continuous seismic survey data; and
    plotting the one or more subterranean features of the survey location identified based on the attenuated continuous seismic survey data.

\* \* \* \* \*